(12) United States Patent
Speidel

(10) Patent No.: US 8,931,362 B2
(45) Date of Patent: Jan. 13, 2015

(54) RECIRCULATING BALL GEAR

(71) Applicant: Gerd Speidel, Stuttgart (DE)

(72) Inventor: Gerd Speidel, Stuttgart (DE)

(73) Assignee: ZF Lenksysteme GmbH, Schwaebisch Gmuend (DE)

(*) Notice: Subject to any disclaimer, the term of this patent is extended or adjusted under 35 U.S.C. 154(b) by 34 days.

(21) Appl. No.: 13/681,730

(22) Filed: Nov. 20, 2012

(65) Prior Publication Data
US 2013/0074626 A1 Mar. 28, 2013

(30) Foreign Application Priority Data

May 25, 2010 (DE) .......................... 10 2010 029 266

(51) Int. Cl.
*F16H 35/00* (2006.01)
*F16H 25/24* (2006.01)
*B62D 5/04* (2006.01)
*F16C 27/04* (2006.01)
*F16H 57/00* (2012.01)
*B62D 3/08* (2006.01)

(52) U.S. Cl.
CPC B62D 3/08 (2013.01); F16H 25/24 (2013.01); B62D 5/0448 (2013.01); F16C 27/04 (2013.01); F16H 57/0006 (2013.01)
USPC ..................................................... 74/388 PS

(58) Field of Classification Search
USPC .......... 74/424.82, 388 PS; 180/444; 384/517, 384/518, 535, 563
See application file for complete search history.

(56) References Cited

U.S. PATENT DOCUMENTS

| | | | |
|---|---|---|---|
| 3,804,562 A * | 4/1974 | Hansson | 418/107 |
| 6,629,578 B2 | 10/2003 | Saruwatari et al. | |
| 6,823,962 B2 | 11/2004 | Iwasa et al. | |
| 6,918,457 B2 | 7/2005 | Saruwatari et al. | |
| 7,284,634 B2 * | 10/2007 | Tatewaki et al. | 180/444 |
| 2002/0096389 A1 | 7/2002 | Saruwatari et al. | |
| 2003/0121714 A1 | 7/2003 | Okada et al. | |
| 2004/0045386 A1 | 3/2004 | Saruwatari et al. | |
| 2004/0069559 A1 | 4/2004 | Iwasa et al. | |
| 2005/0169564 A1 * | 8/2005 | Jia | 384/517 |
| 2005/0205342 A1 | 9/2005 | Tatewaki et al. | |
| 2005/0238274 A1 * | 10/2005 | Zernikow et al. | 384/517 |
| 2011/0167940 A1 | 7/2011 | Shavrnoch et al. | |

FOREIGN PATENT DOCUMENTS

| | | |
|---|---|---|
| DE | 602 11 965 | 1/2007 |
| DE | 10 2007 048 075 | 4/2009 |
| DE | 10 2008 041 872 | 3/2010 |
| EP | 1 270 370 | 1/2003 |
| GB | TI972-92 | 11/1992 |
| JP | 44-22004 | 9/1969 |
| JP | 2003-002220 | 1/2003 |
| WO | WO-2009/046792 | 4/2009 |
| WO | WO-2010/033788 | 3/2010 |
| WO | WO-2011/015374 | 2/2011 |

* cited by examiner

*Primary Examiner* — Justin Krause
(74) *Attorney, Agent, or Firm* — Jordan and Hamburg LLP

(57) ABSTRACT

A recirculating ball gear, in particular for a steering system of a motor vehicle, comprises a nut, which is mounted in a housing by way of a bearing, wherein at least one spring element is disposed on each end face of the bearing between the bearing and the housing. During operation, the recirculating ball gear is exposed to impact in the axial direction, whereby the gear may become damaged over time and annoying rattling noise may develop in the recirculating ball gear. The spring elements are thus operated in the progressive area of characteristic curve.

11 Claims, 4 Drawing Sheets

RECIRCULATING BALL GEAR

This is a Continuation of PCT/EP2011/058462 filed May 24, 2011.

BACKGROUND OF THE INVENTION

The invention relates to a recirculating ball gear, in particular for a steering system of a motor vehicle, comprising a nut, which is mounted in a housing by way of a bearing, wherein at least one spring element is disposed on each end face of the bearing between the bearing and the housing.

During operation, the recirculating ball gear of the type in question can be exposed to impact in the axial direction, thereby the recirculating ball gear may become damaged over time and annoying rattling noise may develop as a result of play in the bearing.

DE 10 2007 048 075 A1 describes a recirculating ball gear comprising a bearing that is spring-mounted on one side. The spring seated against one side of the bearing performs the task of compensating for tilting moments and thermal expansion and also that of fixing the bearing in a housing. However, because of the one-sided spring mounting of the bearing, it is not possible to absorb impact with this design because during operation the impact always acts in the direction of the opposing end faces.

SUMMARY OF THE INVENTION

It is therefore the object of the invention to improve a recirculating ball gear of the type mentioned above to the effect that impact-like loads acting in the axial direction can be cushioned.

The invention achieves the stated object by a recirculating ball bearing of the type in question, in which, according to the invention, the spring elements are operated in the progressive area of a characteristic curve. Impact-like loads in the axial direction of the bearing can thus be reliably cushioned, particularly because of the steep progression in the progressive range of the characteristic curve. Consequently, annoying rattling noise resulting from play in the bearing is also considerably reduced. The characteristic curve of the spring elements can have both a degressive component and/or a linear component; however, this component has no effect during operation. The characteristic curves of the spring elements can, of course, also be only progressive.

The spring elements can have a particular preload, wherein a preload travel and a preload force are located in the area of a small gradient of the progressive area of the characteristic curve. The rattling noise that results from the play in the bearing can thus be damped. However, because the play is generally relatively small compared to the spring travel that is required for damping, the preload travel and the preload force can be advantageously located in the vicinity of the transition after which the characteristic curve rises steeply.

So as to be able to design the characteristic curve very specifically, the spring elements can be connected in parallel and/or in series.

The spring elements can preferably be an ondular washer and/or disk spring, because such a washer or spring allows the respective desired progressive area of the characteristic curve to be implemented cost-effectively. Moreover, this range of the characteristic curve can also be implemented with disks made of elastomers.

In a preferred embodiment, the bearing can be a rolling bearing comprising an outer ring, wherein the spring elements are seated against the outer ring.

A stop element can be provided between the spring elements and the housing. This allows the spring travel of the spring elements to be precisely defined.

So as to assure a reliable positive connection between the bearing and the nut, an inner ring of the bearing can sit on the nut, and the inner ring can be fastened to the nut by way of a fastening ring. The fastening ring can preferably be a snap ring.

However, in an alternative embodiment, the spring elements can be seated against the inner ring of the rolling bearing, wherein, in this case, the outer ring is fixed to the housing so that it cannot be moved axially.

The invention further relates to a steering system for a motor vehicle, and more particularly to a steering system comprising an electric power assistance system, which according to the invention comprises the recirculating ball gear.

An exemplary embodiment of the invention will be described in more detail hereafter based on the accompanying drawings.

DESCRIPTION OF THE PREFERRED EMBODIMENTS

Figure 1:
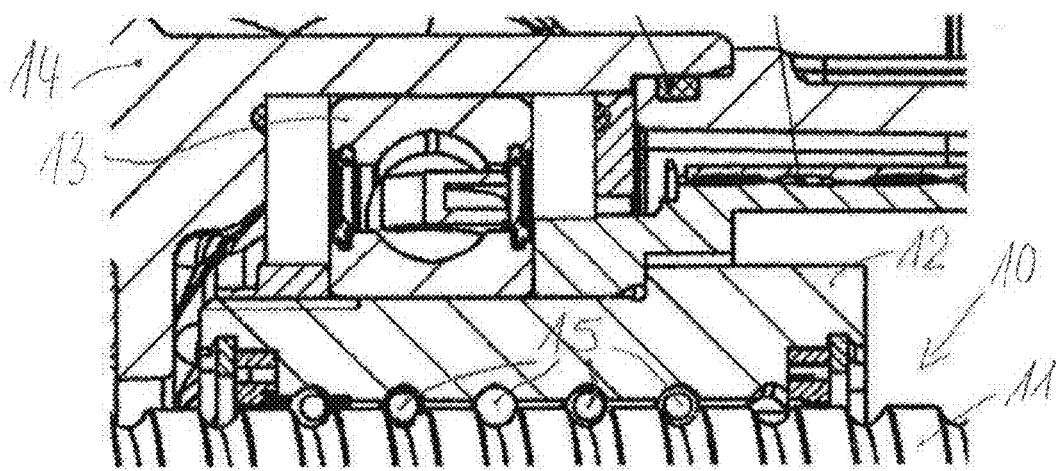
FIG. 1 is a sectional view of a recirculating ball gear.

FIG. 1 shows a recirculating ball gear 10, comprising a threaded spindle 11 and a nut 12, which is disposed thereon, of a steering system of a motor vehicle, which is not shown in detail here. A rolling bearing 13, which is surrounded by a housing 14, is seated on the nut 12. Spheres 15 are disposed between the nut 12 and the threaded spindle 11. The threaded spindle 11 can thus be moved to the left and to the right in the axial direction by rotating the nut 12. Moreover, impact in the axial direction can be transmitted to the threaded spindle 11 by way of a roadway on which a vehicle that is equipped with the recirculating ball gear 10 drives, and this impact can thus be passed on to the nut 12 and the rolling bearing 13.

Figure 2:
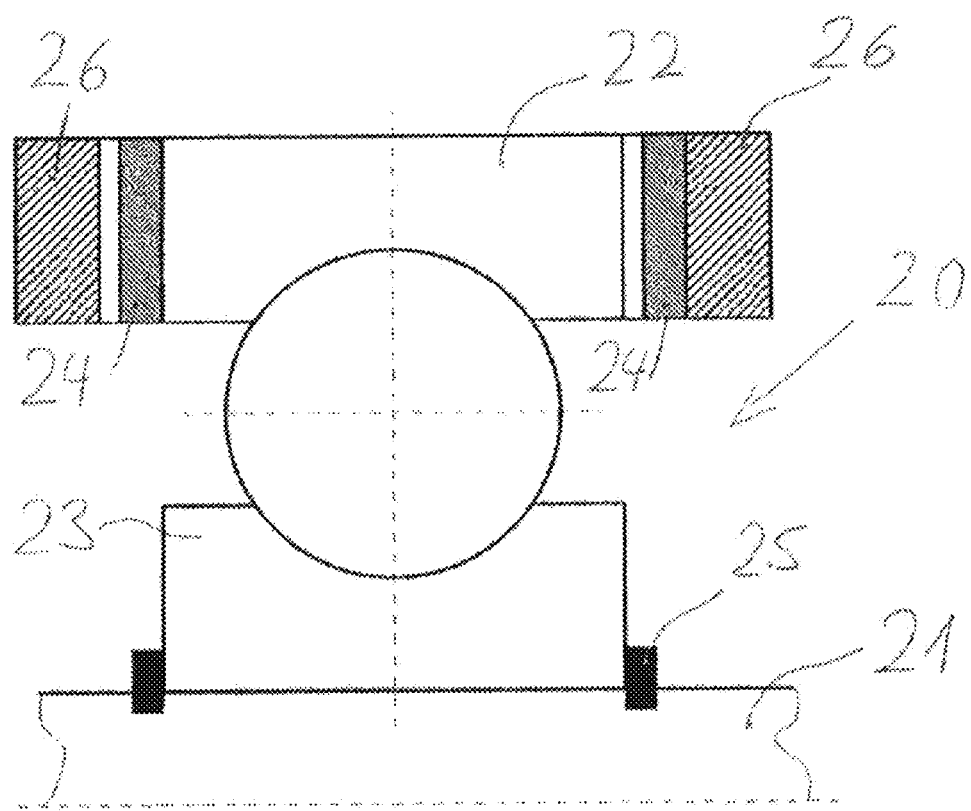
FIG. 2 is a sectional view of a bearing.

FIG. 2 shows a bearing 20 that is seated on a nut 21. The bearing comprises an outer ring 22 and an inner ring 23. A respective spring element 24 is disposed on the end faces of the bearing 20 between the outer ring 22 and stop elements 26, wherein the spring element 24 is an ondular washer in the illustrated case. The spring elements 24 cushion impact-like loads that act on the bearing 20 in the axial direction. Such impact-like loads occur during operation of the steering system when the nut 21 begins to rotate or when the direction of rotation changes. Audible rattling noise would develop because of the inevitable play in the bearing 20 if the spring elements 24 did not cushion the impact-like loads.

The stop elements 26 define the spring travel of the spring elements 24. The inner ring 23 is positively arranged on the nut 21 by way of a fastening ring 25. This allows axially acting movements and loads to be transmitted from the nut 21 to the bearing 20.

Figure 3:
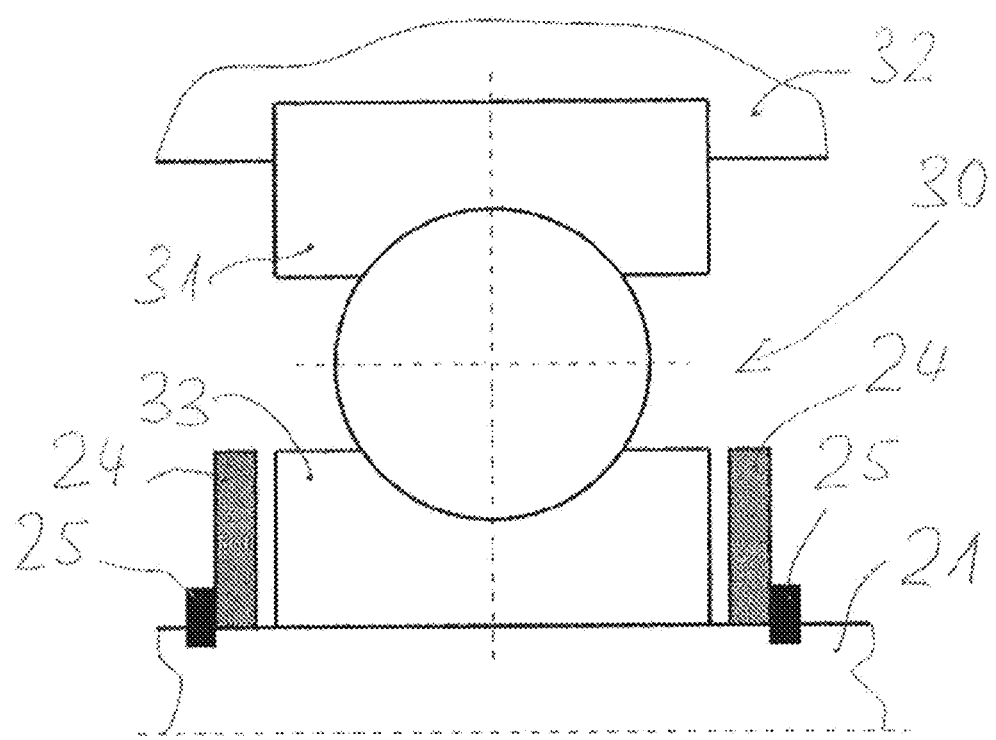
FIG. 3 is a sectional view of a second embodiment of the bearing.

FIG. 3 shows a bearing 30, in which an outer ring 31 is fitted in a housing 32 so that the bearing 30 is fixed in the axial direction. An inner ring 33 rests on the nut 21. The spring element 24, which is designed as an ondular washer, is disposed between the fastening rings 25 and the inner ring 33. The spring elements thus cushion the impact-like loads that act on the bearing 30 in the axial direction. Moreover, this reduces the rattling noise created by the play in the bearing 30 so that this noise can no longer be heard.

Figure 4:
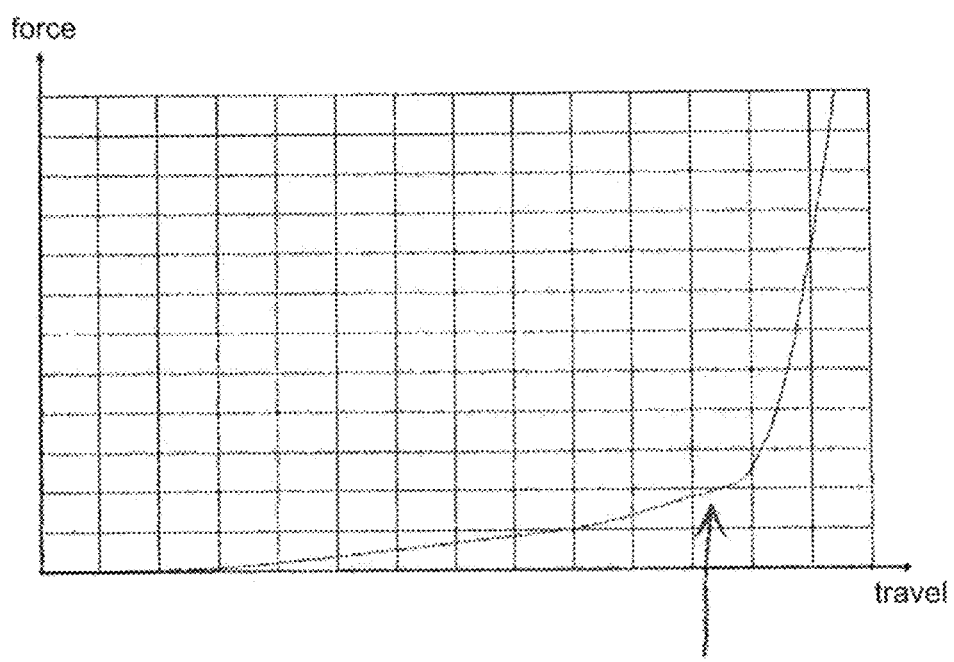
FIG. 4 is a characteristic curve of a spring element.

FIG. 4 shows a characteristic curve of the spring elements 24. The characteristic curve exclusively has a progressive course. The flat progression of the characteristic curve is primarily relevant for cushioning the impact-like loads in a particularly reliably manner. The steeply rising area of the characteristic curve prevents the spring elements 24 from being compressed so much that impact-like loads are exerted on the housings 14 and 32. The spring elements 24 can be preloaded so as to prevent the play in the bearing 20 and the attendant rattling noise, wherein a preload travel and a preload force are located in the area of the lesser gradient of the characteristic curve. Because the play in the bearing 20 is relatively small compared to the spring travel that is required for damping, the preload travel and the preload force can be located in the vicinity of the transition behind which the characteristic curve rises steeply. For example, the preload travel can thus be in the area of the arrow in FIG. 4.

LIST OF REFERENCE NUMERALS

10 recirculating ball gear
11 threaded spindle
12 nut
13 rolling bearing
14 housing
15 sphere
20 bearing
21 nut
22 outer ring
23 inner ring
24 spring element
25 fastening ring
26 stop element
30 bearing
31 outer ring
32 housing
33 inner ring

The invention claimed is:

1. A recirculating ball gear for a steering system of a motor vehicle, comprising:
   a nut, which is mounted in a housing by way of a bearing;
   at least one spring element disposed on each end face of the bearing between the bearing and a stop element; and
   wherein the at least one spring element disposed on each end face is operated exclusively in a progressive area of a characteristic curve for said at least one spring element; and
   wherein a preload travel and a preload force of said at least one spring are selected to correspond to a vicinity of a transition along the characteristic curve after which the characteristic curve rises steeply.

2. The recirculating ball gear according to claim 1, wherein the preload force and the preload travel are selected to correspond to a small gradient of the progressive area of the characteristic curve.

3. The recirculating ball gear according to claim 1, wherein the at least one spring element disposed at each end face comprises a plurality of spring elements connected in parallel and/or in series.

4. A recirculating ball gear according to claim 1, wherein the at least one spring element disposed at each end face comprises at least one of an ondular washer and a disk spring.

5. A recirculating ball gear according to claim 1, wherein the bearing is a rolling bearing comprising an outer ring, wherein the at least one spring element disposed at each end face is seated against the outer ring.

6. A recirculating ball gear according to claim 1, wherein for each end face of the bearing, the stop element is provided between the at least one spring element and the housing.

7. The recirculating ball gear according to claim 5, comprising an inner ring of the bearing seated on the nut, and the inner ring is fastened to the nut by way of fastening rings.

8. A recirculating ball gear according to claim 1, wherein the bearing is a rolling bearing comprising an inner ring, and wherein the at least one spring element disposed at each end face is seated against the inner ring of the bearing.

9. A steering system for a motor vehicle, comprising an electric power assistance system, comprising a recirculating ball gear, said gear comprising:
   a nut, which is mounted in a housing by way of a bearing;
   at least one spring element disposed on each end face of the bearing between the bearing and a stop element; and
   wherein the at least one spring element disposed on each end face is operated exclusively in a progressive area of a characteristic curve for said at least one spring element; and
   wherein a preload travel and a preload force of said at least one spring are selected to correspond to a vicinity of a transition along the characteristic curve after which the characteristic curve rises steeply.

10. The steering system according to claim 9, wherein said characteristic curve of each one spring of said at least one spring has a first portion, a second portion, and a transition portion therebetween, said transition portion comprising said transition, said first portion being relatively flat compared to the second portion, said second portion being relatively steep compared to said first portion, said one spring being preloaded with said preload force and said preload travel corresponding to a vicinity of said transition portion of the characteristic curve.

11. The recirculating ball gear according to claim 1, wherein said characteristic curve of each one spring of said at least one spring has a first portion, a second portion, and a transition portion therebetween, said transition portion comprising said transition, said first portion being relatively flat compared to the second portion, said second portion being relatively steep compared to said first portion, said one spring being preloaded with said preload force and said preload travel corresponding to a vicinity of said transition portion of the characteristic curve.

* * * * *